(12) United States Patent
Lam et al.

(10) Patent No.: US 7,569,781 B2
(45) Date of Patent: Aug. 4, 2009

(54) SWITCH ASSEMBLY HAVING NON-PLANAR SURFACE AND ACTIVATION AREAS

(75) Inventors: Lawrence Lam, San Jose, CA (US); Chrome Cebe, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 11/241,199

(22) Filed: Sep. 30, 2005

(65) Prior Publication Data

US 2007/0074957 A1    Apr. 5, 2007

(51) Int. Cl.
*H01H 9/02*    (2006.01)
(52) U.S. Cl. .................... 200/5 R; 200/5 A; 200/341
(58) Field of Classification Search ............. 200/4, 200/5 A, 5 R, 7, 11 R, 13, 14, 17 R, 18, 341–345; 379/419, 428.01, 433.01, 433.06, 433.07; 455/560, 566, 575.01, 575.9; D14/138 R, D14/138 AA, 138 AB, 140, 341, 346
See application file for complete search history.

(56) References Cited

U.S. PATENT DOCUMENTS

| | | | |
|---|---|---|---|
| D288,746 S | 3/1987 | Allekotte | |
| D306,176 S | 2/1990 | Yubisui et al. | |
| 5,398,310 A | 3/1995 | Tchao et al. | |
| D366,220 S | 1/1996 | Sakamoto | |
| 5,528,235 A * | 6/1996 | Lin et al. | 200/343 |
| D410,440 S | 6/1999 | Carnell | |
| D424,535 S | 5/2000 | Peltola | |
| 6,310,609 B1 | 10/2001 | Morgenthaler | |
| D456,289 S | 4/2002 | Laverick | |
| D456,794 S | 5/2002 | Laverick et al. | |
| 6,437,682 B1 * | 8/2002 | Vance | 200/5 A |
| D466,504 S | 12/2002 | Masuda et al. | |
| D467,918 S | 12/2002 | Fitch et al. | |

(Continued)

FOREIGN PATENT DOCUMENTS

WO    WO 2005024616 A1 *    3/2005

OTHER PUBLICATIONS

Palm Treo 650, [online] [Retrieved on Jan. 4, 2006] Retrieved from the Internet<URL:http://www.palm.com/us/products/smartphones/treo650/details.epl>.

(Continued)

*Primary Examiner*—Elvin G Enad
*Assistant Examiner*—Marina Fishman
(74) *Attorney, Agent, or Firm*—Fenwick & West LLP (57) ABSTRACT

A switch assembly includes a central first switch with a concave surface, a plurality of second switches adjacent to and surrounding the central switch in an elliptical or circular shape, where the second switches form a convex surface, and a plurality of third switches adjacent to the second switches in an outer side of the elliptical or circular shape of the second switches, where the third switches include activation areas with concave surfaces and with flat surfaces outside the activation areas. The third switches can include two switches, one of which is located at one end and the other one of which is located at the opposite end of the elliptical or circular shape of the second switches. The non-planar surfaces of the switch assembly enable one to easily feel the locations of the switches and to get tactile feedback when the finger moved to another switch area.

29 Claims, 7 Drawing Sheets

U.S. PATENT DOCUMENTS

| | | | |
|---|---|---|---|
| D468,714 S | 1/2003 | Maruska et al. | |
| D469,061 S | 1/2003 | Porter | |
| 6,563,061 B2* | 5/2003 | Takahashi | 200/5 A |
| D488,162 S | 4/2004 | Korpai | |
| 6,744,423 B2* | 6/2004 | Kraft et al. | 345/169 |
| D502,703 S | 3/2005 | Tsujimoto et al. | |
| 6,911,608 B2* | 6/2005 | Levy | 200/5 A |
| 6,933,927 B2* | 8/2005 | Lu | 200/4 |
| 6,956,180 B1* | 10/2005 | Su et al. | 200/302.3 |
| D511,342 S | 11/2005 | Chien | |
| 6,963,039 B1* | 11/2005 | Weng et al. | 200/302.1 |
| 7,016,704 B2* | 3/2006 | Pallakoff | 455/566 |
| 7,113,111 B2* | 9/2006 | Tyneski et al. | 341/20 |
| D530,698 S | 10/2006 | Lee et al. | |
| D532,440 S | 11/2006 | Oas | |
| 7,205,959 B2 | 4/2007 | Henriksson | |
| 7,231,208 B2 | 6/2007 | Robertson et al. | |
| D548,732 S | 8/2007 | Cebe et al. | |
| 2002/0151283 A1* | 10/2002 | Pallakoff | 455/90 |
| 2004/0140190 A1* | 7/2004 | Searle et al. | 200/341 |
| 2005/0174260 A1* | 8/2005 | Arneson et al. | 341/34 |
| 2005/0264988 A1 | 12/2005 | Nicolosi | |
| 2006/0265643 A1 | 11/2006 | Saft et al. | |
| 2007/0037611 A1* | 2/2007 | Mori et al. | 455/575.1 |
| 2007/0081303 A1 | 4/2007 | Lam et al. | |

OTHER PUBLICATIONS

Palm Tungsten C, [online] [Retrieved on Jan. 4, 2006] Retrieved from the Internet<URL:http://www.palm.com/us/products/handhelds/tungsten-c/specs.epl>.

Palm Tungsten E2, [online] [Retrieved on Jan. 4, 2006] Retrieved from the Internet<URL:http://www.palm.com/us/products/handhelds/tungsten-e2/specs.epl>.

Palm Tungsten T5, [online] [Retrieved on Jan. 4, 2006] Retrieved from the Internet<URL:http//www.palm.com/us/products/handhelds/tungsten-t5/specs.epl>.

Palm Zire 31, [online] [Retrieved on Jan. 4, 2006] Retrieved from the Internet<URL:http://www.palm.com/us/products/handhelds/zire31/details.epl>.

Palm Zire 72, [online] [Retrieved on Jan. 4, 2006] Retrieved from the Internet<URL:http://www.palm.com/us/products/handhelds/zire72/details.epl>.

Palm LifeDriveQuicktrain.qxd, Dec. 6, 2005, 3 pages.

PCT International Search Report and Written Opinion, PCT/US06/35088, Apr. 24, 2007, 7 pages.

* cited by examiner

SWITCH ASSEMBLY HAVING NON-PLANAR SURFACE AND ACTIVATION AREAS

BACKGROUND OF THE INVENTION

1. Field of the Invention

The present invention relates to switches, and more specifically, a switch assembly having non-planar surfaces and activation areas.

2. Description of the Related Art

Modem electronic devices are provided with a large number of functions, but at the same time the size of the electronic devices is becoming smaller and smaller. Thus, it is a challenge to provide a sufficient number of control switches that can be used to navigate through the user interfaces in the graphical user interfaces of the electronic devices and operate the provided functionalities without occupying a large area of the electronic devices.

It may be possible to place many control switches in a small area, which would require making the switches smaller and positioning the switches closer to each other. However, this may interfere with the convenient use of the electronic devices, because it becomes more difficult for a user to physically select and touch a particular switch due to the small size of the switch and its proximity to other switches. For example, a user may intend to select and activate a particular one of the switches but end up accidentally activating a different one of the switches due to the small size of the particular switch and its proximity to the other different switches.

Therefore, there is a need for smaller switches placed in a small area without interfering with the convenient use of the switches.

SUMMARY OF THE INVENTION

One embodiment disclosed includes a compact and versatile switch assembly for use in electronic devices such as personal digital assistants (PDAs) or cellular telephones, for navigating through and activating items of the user interface displayed on the display of the electronic devices. In one embodiment, the switch assembly includes a central first switch with a concave surface and associated with a first function, a plurality of second switches adjacent to and surrounding the central switch in an elliptical shape or a circular shape, where the second switches form a convex surface and are associated with second functions, and a plurality of third switches adjacent to the second switches in an outer side of the elliptical or circular shape of the second switches, where the third switches are associated with third functions and include activation areas with convex or concave surfaces and flat surfaces outside the activation areas.

In one embodiment, the first function can be selecting an item on the user interface displayed on the electronic devices. The second switches can include four switches located at an upper side, a lower side, a left side, and a right side of the elliptical or circular shape, and each of the four switches is associated with a navigational direction such as up, down, left or right. The second function can be navigating through items on the user interface displayed on the electronic devices. The third function of the third switches can be activating an application of the electronic device.

In a first embodiment of the present invention, the third switches include two switches, one of which is located at one end of the elliptical or circular shape of the second switches and the other one of which is located at an opposite end of the elliptical or circular shape of the second switches. In a second embodiment of the present invention, the third switches include four switches, two of which are located at one end of the elliptical or circular shape of the second switches and the other two of which are located at an opposite end of the elliptical or circular shape of the second switches. In a third embodiment of the present invention, the third switches include four switches located at an upper end, a lower end, a left end, and a right end of the elliptical or circular shape of the second switches. In a fourth embodiment of the present invention, the third switches include eight switches, four of which are located at an upper end, a lower end, a left end, and a right end, respectively, of the elliptical or circular shape, and the remaining four of which are located between said four of the switches located at the upper end, the lower end, the left end, and the right end of the elliptical or circular shape. In a fifth embodiment of the present invention, the third switches can enclose the second switches. In a sixth embodiment of the present invention, the activation areas of the third switches may be separated by convex dividers.

An advantage of the switch assembly in accordance with the present invention is that the non-planar surfaces of the switch assembly make it easy for the switch assembly to be used. For example, one may center a thumb or other finger in the concavity of the central switch to select the central switch. It is easy to feel where the second switches are located because they have convex surfaces in contrast to the concave surface of the central switch; by sliding one's finger over from the central switch to the second switches, one gets tactile feedback that the finger moved to another switch or control area. Similarly, it is easy to feel where the third switches and their activation areas are located, because the third switches have flat (planar) surfaces and their activation areas have concave or convex surfaces; by sliding one's finger over from the second switches to the third switches and especially their concave or convex activation areas, one gets tactile feedback that the finger moved to another switch or control area.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
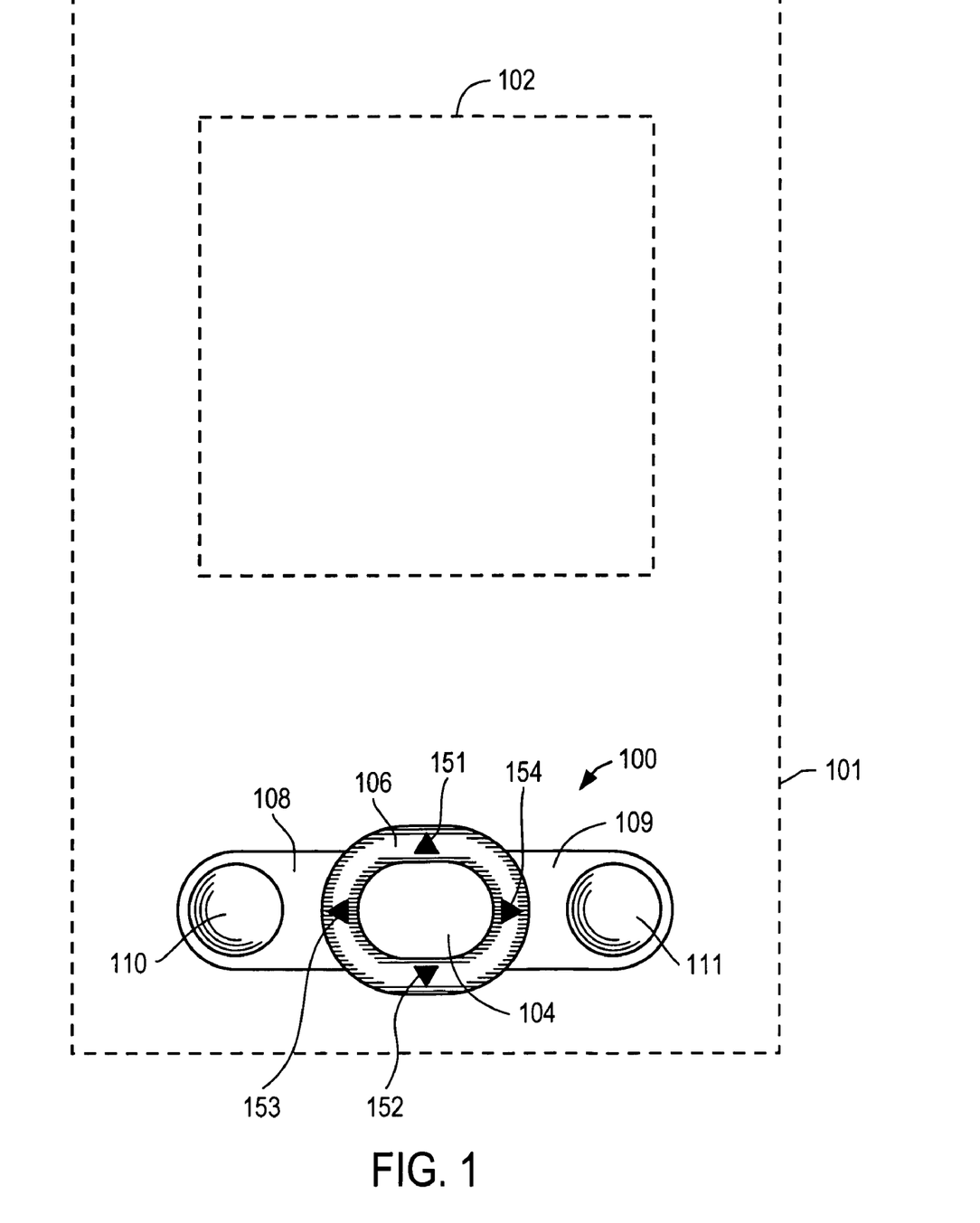
FIG. 1 is illustrates an electronic device with a switch assembly in accordance with a first embodiment of the present invention.

FIG. 1 is illustrates an electronic device 101 with a switch assembly in accordance with a first embodiment of the present invention. The electronic device 101 may be any type of electronic device that requires the use of switches, for example, a PDA, a cellular telephone, a portable media player, a smartphone, a PDA phone, a mobile manager, a portable computer, etc. The electronic device 101 includes a display 102 and a switch assembly 100 for navigating through the user interface and selecting certain items shown in the display 102 or activating certain applications of the electronic device 101.

The switch assembly includes a central switch 104, a navigational ring switch 106 adjacent to and surrounding the central switch 104, and two additional switches 108, 109 adjacent to the navigation ring switch 104 and positioned on the left and right sides of the navigational ring switch 106. In one embodiment, the central switch 104 is typically used to select or activate applications or other items of the electronic device 101, although the central switch 104 can be used for other functions. The navigational ring switch 106 includes four switches corresponding to 4 directions (up 151, down 152, left 153, and right 154), and is typically used to navigate through the user interface shown on the display 102 in one embodiment, although the ring switch 106 may be used for other functions such as selecting or activating certain items or applications. The ring switch 106 has an elliptical shape in FIG. 1, but can also have other shapes such as a circular shape, a square shape, a rectangular shape, or a diamond shape, in other embodiments. The two switches 108, 109 are typically used to select or activate certain applications or items of the electronic device 101. By alternating the functions of the switches in the switch assembly 100, i.e., by having the central switch 104 and the additional switches 108, 109 be associated with selection functions while having the navigational ring switch 106 be associated with navigational functions, a number of functions of the electronic device 101 can be integrated into the switch assembly 100 in a compact and convenient manner.

The switches 108, 109 include activation areas 110, 111 having a concave surface in one embodiment. In alternative embodiments, the activation areas 110, 111 can have convex surfaces or "divots" (e.g., a plurality of tiny concave or convex surfaces), or other types of non-smooth surfaces such that its texture differs from the texture of adjacent surface areas outside the activation area. The activation areas 110, 111 correspond to the location of the switch mechanics underlying the switches 110, 111, and make it easier for a user to feel and locate where the switches 110, 111 are and where to touch in order to activate the switches 110, 111.

The switches 104, 106, 108, 109 form a non-planar surface with respect to each other, such that one may easily feel that one's finger is moving from one part of the switch to another part of the switch just by tactile contact with the switches 104, 106, 108, 109, as will be explained in greater detail with reference to FIG. 2. For example, the central switch 104 may have a concave surface, the navigational ring switch 106 may have a convex surface, and the switches 108, 109 may have concave activation areas 110, 111 with flat surfaces outside the activation areas 110, 111. For another example, the central switch 104 may have a concave surface, the navigational ring switch 106 may have a convex surface, and the switches 108, 109 may have convex activation areas 110, 111 with flat surfaces outside the activation areas 110, 111. For another example, the central switch 104 may have a convex surface, the navigational ring switch 106 may have a concave surface, and the switches 108, 109 may have concave activation areas 110, 111 and flat surfaces outside the activation areas 110, 111. For another example, the central switch 104 may have a convex surface, the navigational ring switch 106 may have a concave surface, and the switches 108, 109 may have convex activation areas 110, 111 and flat surfaces outside the activation areas 110, 111.

Figure 2:
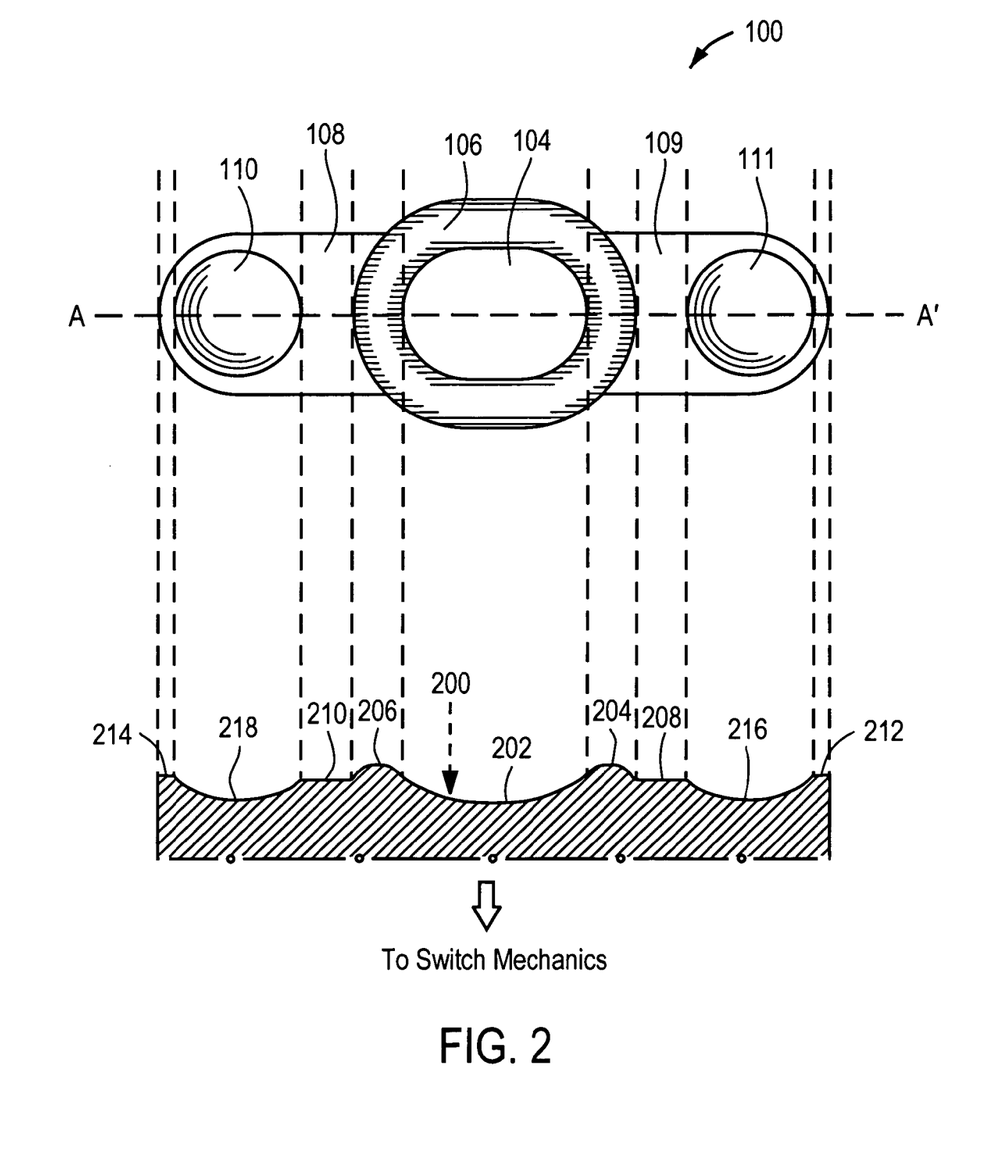
FIG. 2 is illustrates the structure of the switch assembly of FIG. 1 in greater detail in accordance with the first embodiment of the present invention.

FIG. 2 is illustrates the structure of the switch assembly 100 of FIG. 1 in greater detail, in accordance with the first embodiment of the present invention. The line 200 illustrates the contour of the surface of the switch assembly 100 along lines A-A' of the switch assembly 100 in FIG. 2.

As shown by the contour 200, the central switch 104 has a concave surface 202, the navigational ring switch 106 has a convex surface 204, 206, and the switches 108, 109 have mostly flat (planar) surfaces 208, 210, 212, 214 outside the activation areas 110, 111 with the activation areas 110, 111 having concave surfaces 216, 218. Such non-planar surface makes it easy for the switch assembly 100 to be used. For example, one may center his thumb or other finger in the concavity 202 of the central switch 104 to select the central switch 104. In addition, it is easy to feel where the navigational ring switch 106 is located because the navigational ring switch 106 has a convex surface 204, 206 in contrast to the concave surface 202 of the central switch 104; by sliding one's finger over from the central switch 104 to the navigational ring switch 106, one gets tactile feedback that the finger moved to another switch or control area. Similarly, it is easy to feel where the additional switches 108, 109 and their activation areas 110, 111 are located, because the switches 108, 109 have flat (planar) surfaces 208, 210, 212, 214 and their activation areas 110, 111 have concave surfaces 216, 218 in contrast to the convex surface 204, 206 of the navigational ring switch 106; by sliding one's finger over from the navigational ring switch 106 to the switches 108, 109 and especially their concave activation areas 110, 111, one gets tactile feedback that the finger moved to another switch or control area.

As shown in FIG. 2, the switches 104, 106, 108, 109 are connected to corresponding switch mechanics. The switches 104, 106, 108, and 109 may be any type of switch, e.g., a dome switch, a microswitch, or a touch panel, and include the appropriate switch mechanics (not shown) corresponding to the type of the switch.

Figure 3:
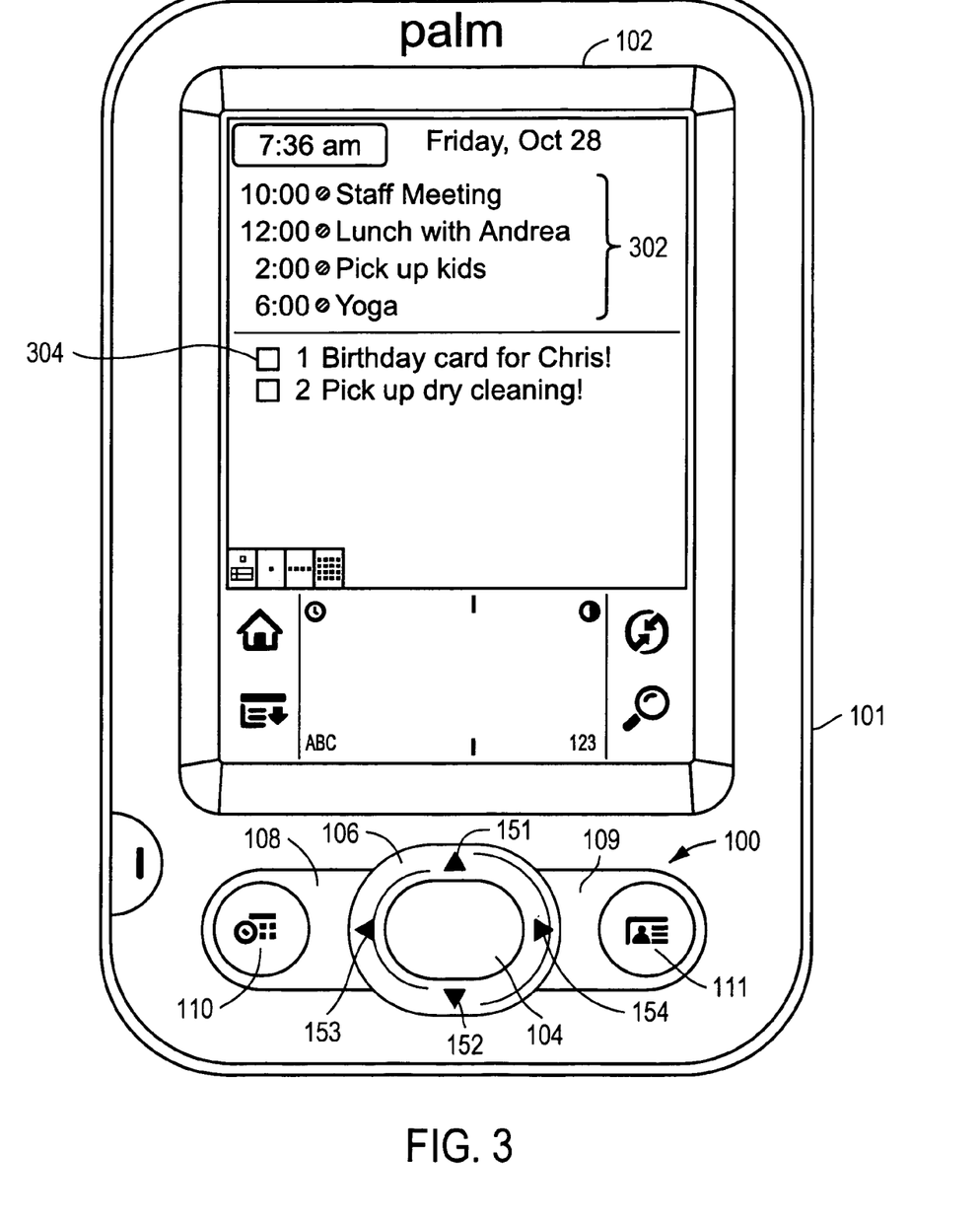
FIG. 3 illustrates a personal digital assistant (PDA) type electronic device including a switch assembly in accordance with the first embodiment of the present invention.

FIG. 3 illustrates a personal digital assistant (PDA) type electronic device 101 including a switch assembly 100 in accordance with the first embodiment of the present invention. In one embodiment, the navigational ring switch 106 is configured (by software) to navigate through the items 302 in the user interface shown on the display 102 of the device 101. The central switch 104 is configured to select a particular item 304 when activated. The additional switches 108, 109 are configured to launch or activate certain applications of the electronic device 101 when activated. For example, a calendar application may be launched if the activation area 110 of the switch 108 is pressed, and an address book application may be launched if the activation area 111 of the switch 109 is pressed. Note that the functions associated with the switches 104, 106, 108, 109 are not limited to what is described herein, and that the switches 104, 106, 108, 109 may be associated any other function as necessary for the electronic device 101. Moreover, the switches 104, 106, 108, 109 can be configured to provide different functions for different applications executing an electronic device. Alternatively, these switches can also be configured or programmed through the device to perform specific functions.

Figure 4A:
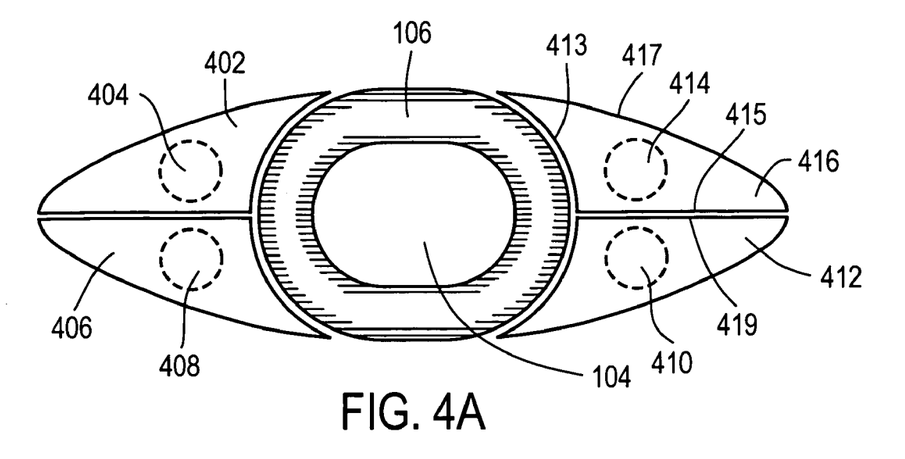
FIG. 4A illustrates a switch assembly in accordance with a second embodiment of the present invention.

FIG. 4A illustrates a switch assembly in accordance with a second embodiment of the present invention. The switch assembly of FIG. 4A is functionally identical to the switch assembly 100 shown in FIGS. 1-3, but structurally differs by integrating the switches 402, 406, 412, 416. The switch assembly is comprised of a concave central switch 104, a convex navigational ring switch 106, and four additional switches 402, 406, 412, 416. Two switches 402, 406 are located on the left side of the navigational ring switch 106, and the other two switches 412, 416 are located on the right side of the navigational ring switch 106. Each of the switches 402, 406, 412, 416 has a flat (planar) surface with a concave activation area 404, 408, 410, 414, respectively. The second embodiment shown in FIG. 4A makes it possible to have additional (at least 4) functions associated with the switches 402, 406, 412, 416 without occupying a lot of space.

In one embodiment, the four additional switches 402, 406, 412, 416 each have smooth triangular-like shapes. For example, the first leg 413 of the switch 416 tracks along a perimeter of the navigational ring switch 106, the length of the second leg 415 of the switch 416 tracks along the length of the second leg 419 of the adjacent switch 412, and the third leg 417 of the switch 416 provides a rounded edge that roughly tracks along the edge of the navigational ring switch 106. The other switches 402, 406, 412 are all configured in a similar fashion. The overall configuration, as illustrated, provides an elegant design, e.g., a flowing elliptical design, while maintaining or increasing functionality and user friendliness.

Figure 4B:
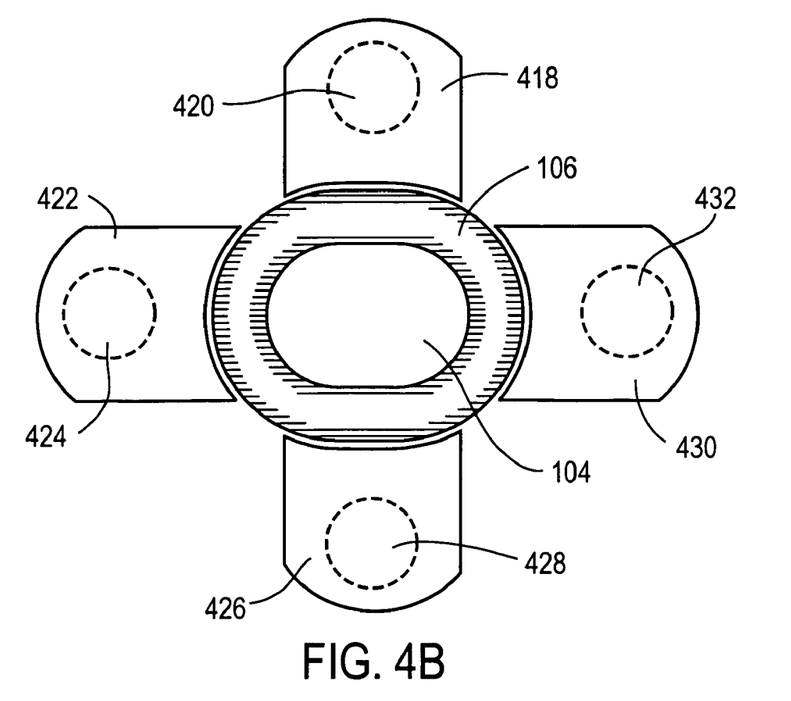
FIG. 4B illustrates a switch assembly in accordance with a third embodiment of the present invention.

FIG. 4B illustrates a switch assembly in accordance with a third embodiment of the present invention. The switch assembly of FIG. 4B is functionally identical to the switch assembly 100 shown in FIGS. 1-3, but structurally differs by integrating the additional switches 418, 422, 426, 430. The switch assembly is comprised of a concave central switch 104, a convex navigational ring switch 106, and four additional switches 418, 422, 426, 430. The switch 418 is located on the upper side of the navigational ring switch 106, the switch 422 is located on the left side of the navigational ring switch 106, the switch 426 is located on the lower side of the navigational ring switch 106, and the switch 430 is located on the right side of the navigational ring switch 106. Each of the switches 418, 422, 426, 430 has a flat (planar) surface with a concave activation area 420, 424, 428, 432, respectively. The third embodiment shown in FIG. 4B makes it possible to have additional (at least 4) functions associated with the switches 402, 406, 412, 416 in a compact and symmetrical manner without occupying a lot of space.

Figure 4C:
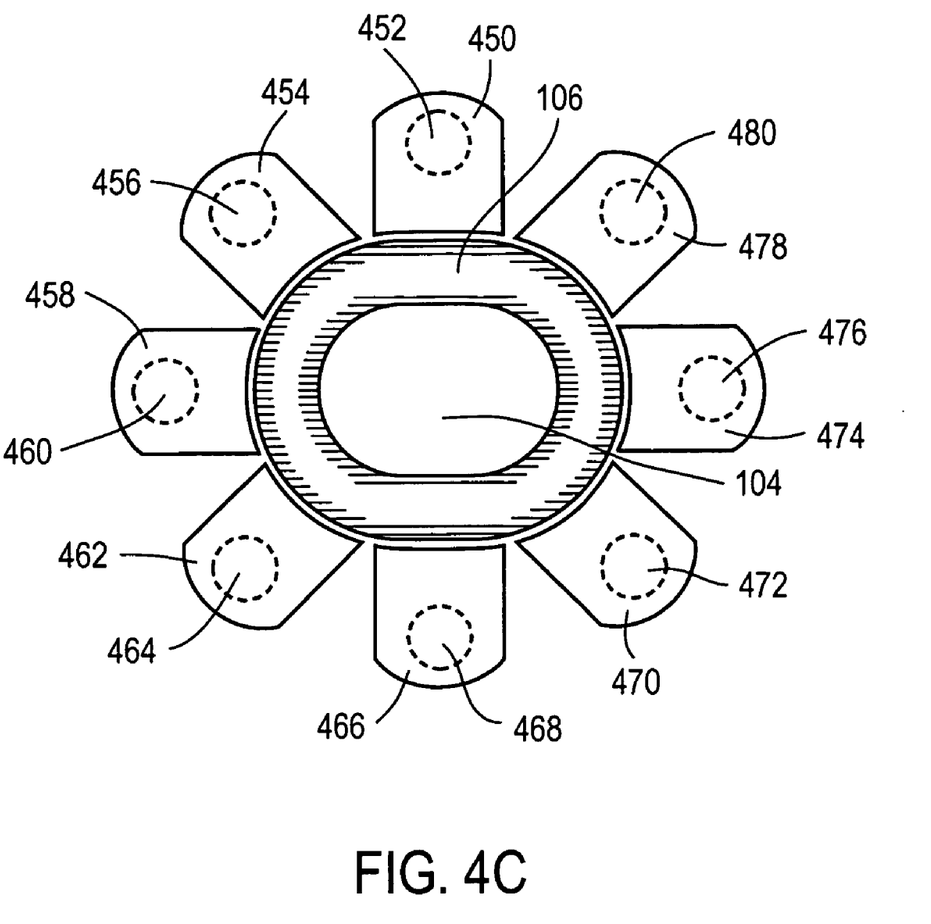
FIG. 4C illustrates a switch assembly in accordance with a fourth embodiment of the present invention.

FIG. 4C illustrates a switch assembly in accordance with a fourth embodiment of the present invention. The switch assembly of FIG. 4C is functionally identical to the switch assembly 100 shown in FIGS. 1-3, but structurally differs by integrating the eight additional switches 450, 454, 458, 462, 466, 470, 474, 478. As with the previously described configurations, this configuration also provides a navigational region in which buttons are structurally configured in close proximity, e.g., adjacent, but also includes surface or texture differences that allow easy distinguishing between them. By way of example in FIG. 4C, the switch assembly is comprised of a concave central switch 104, a convex navigational ring switch 106, and eight additional switches 450, 454, 458, 462, 466, 470, 474, 478. The switch 450 is located on the upper side of the navigational ring switch 106, the switch 458 is located on the left side of the navigational ring switch 106, the switch 466 is located on the lower side of the navigational ring switch 106, the switch 474 is located on the right side of the navigational ring switch 106, the switch 454 is located between the switches 450, 458, the switch 462 is located between the switches 458, 466, the switch 470 is located between the switches 466, 474, and the switch 478 is located between the switches 450, 474. Each of the switches 450, 454, 458, 462, 466, 470, 474, 478 has a flat (planar) surface with a concave activation area 452, 456, 460, 464, 468, 472, 476, 480, respectively. The fourth embodiment shown in FIG. 4C makes it possible to have a number of additional (at least 8) functions associated with the switches 450, 454, 458, 462, 466, 470, 474, 478 in a compact and symmetrical manner without occupying a lot of space.

Figure 5:
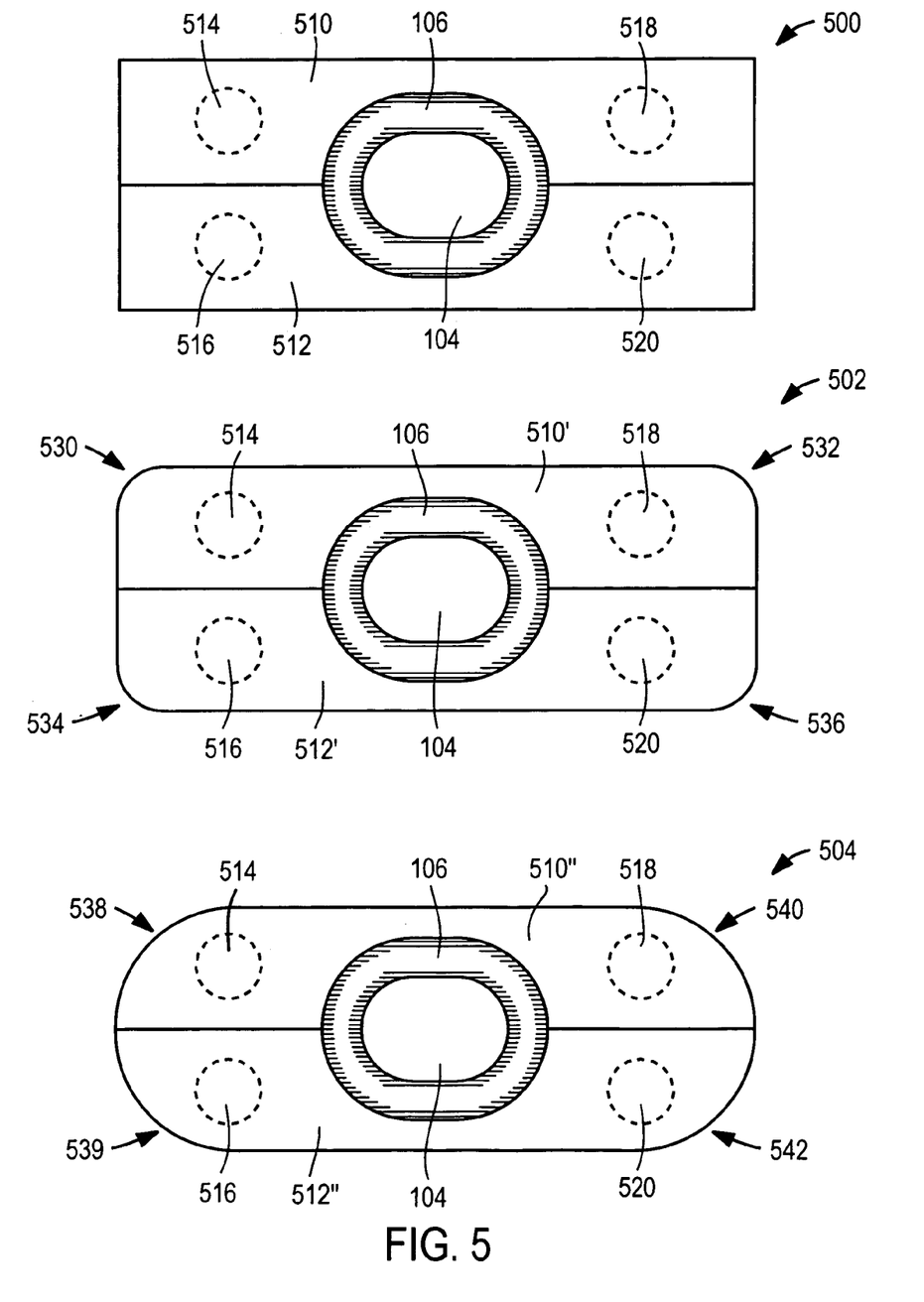
FIG. 5 illustrates switch assemblies in accordance with a fifth embodiment of the present invention.

FIG. 5 illustrates switch assemblies 500, 502, 504 in accordance with a fifth embodiment of the present invention. The switch assembly 500 is functionally identical to the switch assembly 100 shown in FIGS. 1-3, but structurally differs by integrating two switch regions 510, 512 enclosing the navigational ring switch 106. The switch region 510 includes two concave activation areas 514, 518, and the switch region 512 includes two concave activation areas 516, 520. The switch assembly 502 is identical to the switch assembly 500, except that it has smoother edges at the outer corners 530, 532, 534, 536 of the switch regions 510', 512'. The switch assembly 504 is identical to the switch assembly 500 except that it has even smoother (almost round) edges at the outer corners 538, 539, 540, 542 of the switch regions 510", 512".

Figure 6:
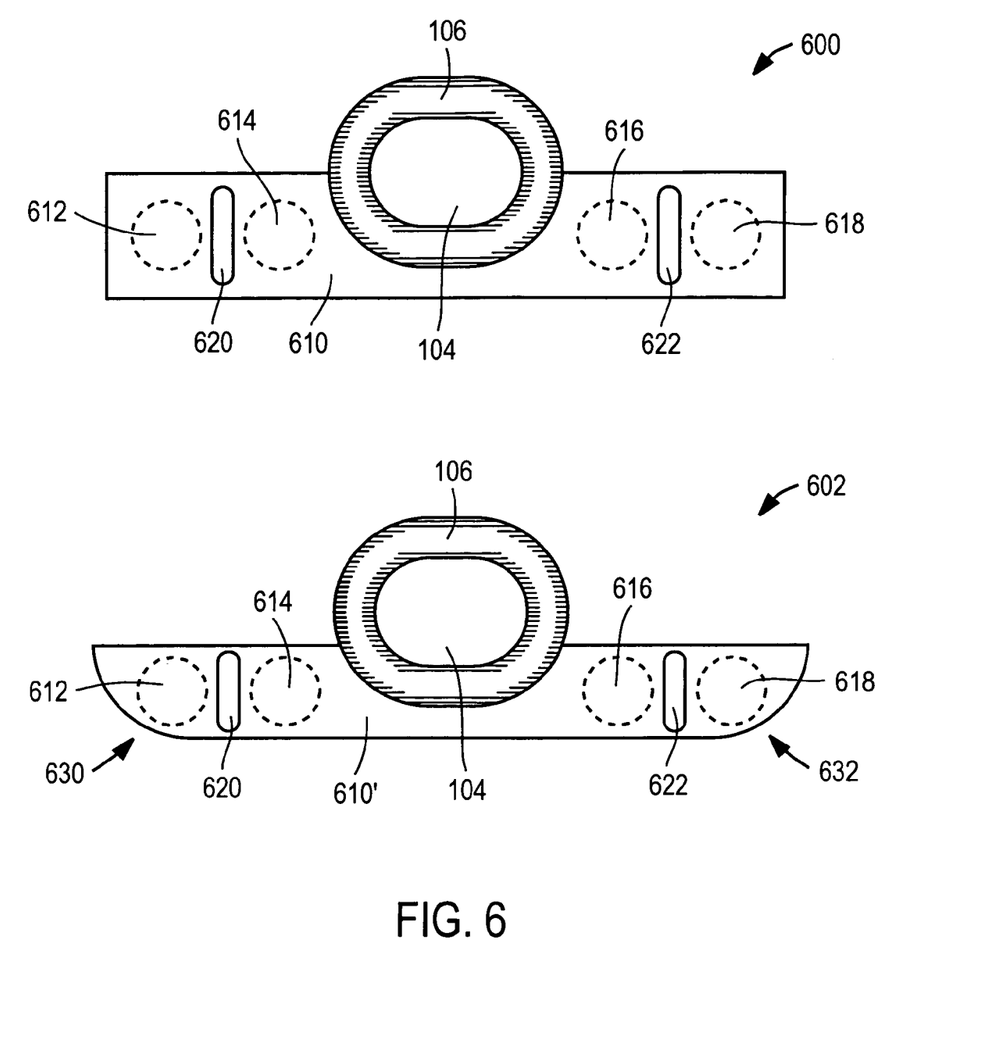
FIG. 6 illustrates switch assemblies in accordance with a sixth embodiment of the present invention.

FIG. 6 illustrates switch assemblies 600, 602 in accordance with a sixth embodiment of the present invention. The switch assembly 602 is functionally identical to the switch assembly 100 shown in FIGS. 1-3, but structurally differs by integrating a switch region 610 enclosing a bottom half of the navigational ring switch 106. The switch region 610 includes four concave activation areas 612, 614, 616, 618, where two of the activation areas 612, 614 are separated by a convex divider 620, and the other two of the activation areas 616, 618 are separated by another convex divider 622. The convex dividers 620, 622 serve as "speed bumps" such that one can tactically feel and distinguish between two activation areas 612, 614 or 616, 168 that are positioned close to each other. Although the switch region 610 encloses only the bottom half of the navigational ring switch 106 in the example of FIG. 6, note that the switch region 610 can be modified to enclose the upper half or the entire navigational ring switch 106. Furthermore, although the switch region 610 includes only 4 activation areas 612, 614, 616, 618 in the example of FIG. 6, note that the switch region 610 can include any number of activation areas where two or more of the activation areas are divided by a divider. The switch assembly 602 is identical to the switch assembly 600, except that the switch region 610' has smoother edges 630, 632.

Upon reading this disclosure, those of skill in the art will appreciate still additional alternative structural and functional designs for a switch assembly through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A switch assembly, comprising:
a central first switch having a concave surface and associated with a first function;
a plurality of second switches adjacent to and surrounding the central first switch in an elliptical shape or a circular shape, the second switches having a convex surface and associated with second functions; and
a plurality of third switches adjacent to the second switches in an outer side of the elliptical shape or the circular shape of the second switches, the third switches associated with third functions, and including activation areas with convex or concave surfaces and with flat surfaces outside the activation areas, a single switch assembly including the plurality of second switches and the plurality of third switches, wherein the activation areas are separated by convex dividers.

2. The switch assembly of claim 1, wherein:
the second switches include four of the second switches located at an upper side, a lower side, a left side, and a right side of the elliptical shape or the circular shape, each of the four second switches associated with a direction.

3. The switch assembly of claim 1, wherein:
the third switches include two of the third switches, one of which is located at one end of the elliptical or circular shape of the second switches and the other one of which is located at an opposite end of the elliptical or circular shape of the second switches.

4. The switch assembly of claim 1, wherein:
the third switches include four of the third switches, two of which are located at one end of the elliptical or circular shape of the second switches and the other two of which are located at an opposite end of the elliptical or circular shape of the second switches.

5. The switch assembly of claim 1, wherein:
the third switches include four of the third switches located at an upper end, a lower end, a left end, and a right end of the elliptical or circular shape of the second switches.

6. The switch assembly of claim 1, wherein:
the third switches include eight of the third switches, four of which are located at an upper end, a lower end, a left end, and a right end of the elliptical or circular shape of the second switches, and the remaining four of which are located between said four of the switches located at the upper end, the lower end, the left end, and the right end of the elliptical or circular shape of the second switches.

7. An electronic device, comprising:
a display for displaying a user interface for controlling the electronic device; and
a switch assembly configured for operating the user interface, the switch assembly including:
a central first switch having a concave surface and associated with a first function;
a plurality of second switches adjacent to and surrounding the central first switch in an elliptical shape or a circular shape, the second switches having a convex surface and associated with second functions; and
a plurality of third switches adjacent to the second switches in an outer side of the elliptical shape or the circular shape of the second switches, the third switches associated with third functions, and including activation areas with convex or concave surfaces and flat surfaces outside the activation areas, a single switch assembly including the plurality of second switches and the plurality of third switches, wherein the activation areas are separated by convex dividers.

8. The electronic device of claim 7, wherein:
the first function is selecting an item on the user interface.

9. The electronic device of claim 7, wherein:
the second switches include four of the second switches located at an upper side, a lower side, a left side, and a right side of the elliptical shape or the circular shape, each of the four second switches associated with a direction.

10. The electronic device of claim 9, wherein:
the second function is navigating through items on the user interface.

11. The electronic device of claim 7, wherein:
the third switches include two of the third switches, one of which is located at one end of the elliptical or circular shape of the second switches and the other one of which is located at an opposite end of the elliptical or circular shape of the second switches.

12. The electronic device of claim 7, wherein:
the third switches include four of the third switches, two of which are located at one end of the elliptical or circular shape of the second switches and the other two of which are located at an opposite end of the elliptical or circular shape of the second switches.

13. The electronic device of claim 7, wherein:
the third switches include four of the third switches located at an upper end, a lower end, a left end, and a right end of the elliptical or circular shape of the second switches.

14. The electronic device of claim 7, wherein:
the third switches include eight of the third switches, four of which are located at an upper end, a lower end, a left end, and a right end of the elliptical or circular shape of the second switches, and the remaining four of which are located between said four of the switches located at the upper end, the lower end, the left end, and the right end of the elliptical or circular shape of the second switches.

15. The electronic device of claim 7, wherein:
the third function is activating an application of the electronic device.

16. A switch assembly configured for operating a user interface on a display of an electronic device, the switch assembly comprising:
a central first switch having a concave surface and configured for selecting an item on the user interface;
a plurality of second switches adjacent to and surrounding the central first switch in an elliptical shape, the second switches having a convex surface and configured for navigating through items on the user interface; and
a plurality of third switches adjacent to the second switches in an outer side of the elliptical shape of the second switches, the third switches configured for activating applications of the electronic device, and including activation areas with concave surfaces and with flat surfaces outside the activation areas, a single switch assembly including the plurality of second switches and the plurality of third switches, wherein the activation areas are separated by convex dividers.

17. The switch assembly of claim 16, wherein:
the second switches include four of the second switches located at an upper side a lower side, a left side, and a right side of the elliptical shape, each of the four second switches associated with a direction.

18. The switch assembly of claim 16, wherein:
the third switches include two of the third switches, one of which is located at one end of the elliptical shape of the second switches and the other one of which is located at an opposite end of the elliptical shape of the second switches.

19. An electronic device, comprising:
a display for displaying a user interface for controlling the electronic device; and
a switch assembly configured for operating the user interface, the switch assembly including:
a central first switch having a concave surface and configured for selecting an item on the user interface;
a plurality of second switches adjacent to and surrounding the central first switch in an elliptical shape, the second switches forming a convex surface and configured for navigating through items on the user interface; and
a plurality of third switches adjacent to the second switches in an outer side of the elliptical shape of the second switches, the third switches configured for activating applications of the electronic device, and including activation areas with concave surfaces and with flat surfaces outside the activation areas, a single switch assembly including the plurality of second switches and the plurality of third switches, wherein the activation areas are separated by convex dividers.

20. The electronic device of claim 19, wherein:
the second switches include four of the second switches located at an upper side, a lower side, a left side, and a right side of the elliptical shape, each of the four second switches associated with a direction.

21. The electronic device of claim 19, wherein:
the third switches include two of the third switches, one of which is located at one end of the elliptical shape of the second switches and the other one of which is located at an opposite end of the elliptical shape of the second switches.

22. A switch assembly configured for operating a user interface on a display of an electronic device, the switch assembly comprising:
a central first switch having a concave surface and configured for selecting an item on the user interface;
a plurality of second switches adjacent to and surrounding the central first switch in an elliptical or circular shape, the second switches having a convex surface and configured for navigating through items on the user interface; and
a plurality of third switches adjacent to the second switches in an outer side of the elliptical or circular shape of the second switches, the third switches configured for activating applications of the electronic device, and including activation areas with surfaces of a first texture and with surfaces of a second texture different from the first texture outside the activation areas, a single switch assembly including the plurality of second switches and the plurality of third switches, wherein the activation areas are separated by convex dividers.

23. The switch assembly of claim 22, wherein:
the second switches include four of the second switches located at an upper side, a lower side, a left side, and a right side of the elliptical or circular shape, each of the four second switches associated with a direction.

24. The switch assembly of claim 22, wherein:
the third switches include two of the third switches, one of which is located at one end of the elliptical or circular shape of the second switches and the other one of which is located at an opposite end of the elliptical or circular shape of the second switches.

25. An electronic device, comprising:
a display for displaying a user interface for controlling the electronic device; and
a switch assembly configured for operating the user interface, the switch assembly including:
a central first switch having a concave surface and configured for selecting an item on the user interface;
a plurality of second switches adjacent to and surrounding the central first switch in an elliptical or circular shape, the second switches forming a convex surface and configured for navigating through items on the user interface; and
a plurality of third switches adjacent to the second switches in an outer side of the elliptical or circular shape of the second switches, the third switches configured for activating applications of the electronic device, and including activation areas with surfaces of a first texture and with surfaces of a second texture different from the first texture outside the activation areas, a single switch assembly including the plurality of second switches and the plurality of third switches, wherein activation areas are separated by convex dividers.

26. The electronic device of claim 25, wherein:
the second switches include four of the second switches located at an upper side, a lower side, a left side, and a right side of the elliptical or circular shape, each of the four second switches associated with a direction.

27. The electronic device of claim 25, wherein:
the third switches include two of the third switches, one of which is located at one end of the elliptical or circular shape of the second switches and the other one of which is located at an opposite end of the elliptical or circular shape of the second switches.

28. A switch assembly configured for operating a user interface on a display of an electronic device, the switch assembly comprising:
a central first switch configured for selecting an item on the user interface;
a plurality of second switches adjacent to and surrounding the central first switch, the second switches configured for navigating through items on the user interface; and
a plurality of third switches adjacent to the second switches on an outer side of the second switches, the third switches configured for activating applications of the electronic device and including activation areas with concave surfaces and with flat surfaces outside the activation areas, a single switch assembly including the plurality of second switches and the plurality of third switches, wherein the activation areas are separated by convex dividers.

29. A switch assembly configured for operating a user interface on a display of an electronic device, the switch assembly comprising:

a central first switch configured for selecting an item on the user interface;

a plurality of second switches adjacent to and surrounding the central first switch, the second switches configured for navigating through items on the user interface; and a plurality of third switches adjacent to the second switches on an outer side of the second switches, the third switches configured for activating applications of the electronic device and including activation areas with surfaces of a first texture different from a second texture of the surfaces outside the activation areas, a single switch assembly including the plurality of second switches and the plurality of third switches, wherein the activation areas are separated by convex dividers.

* * * * *

UNITED STATES PATENT AND TRADEMARK OFFICE
CERTIFICATE OF CORRECTION

PATENT NO. : 7,569,781 B2  Page 1 of 1
APPLICATION NO. : 11/241199
DATED : August 4, 2009
INVENTOR(S) : Lam et al.

It is certified that error appears in the above-identified patent and that said Letters Patent is hereby corrected as shown below:

Claim 17, Column 9, line 9, after "an upper side" insert --,--.

Claim 25, Column 10, line 35, after "wherein" insert --the--.

Signed and Sealed this

Twenty-third Day of March, 2010

David J. Kappos
*Director of the United States Patent and Trademark Office*